(12) United States Patent
Pine

(10) Patent No.: US 7,046,864 B1
(45) Date of Patent: May 16, 2006

(54) IMAGING SYSTEM HAVING AN IMAGE MEMORY BETWEEN THE FUNCTIONAL PROCESSING SYSTEMS

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 541 days.

(21) Appl. No.: 09/801,401

(22) Filed: Mar. 7, 2001

(51) Int. Cl.
*G06K 9/54* (2006.01)

(52) U.S. Cl. ..................................... 382/305
(58) Field of Classification Search .............. 382/232, 382/276, 299, 303, 305, 307; 358/403
See application file for complete search history.

(56) References Cited

U.S. PATENT DOCUMENTS

| | | | | |
|---|---|---|---|---|
| 5,317,679 A | * | 5/1994 | Ueda et al. | 345/611 |
| 5,619,624 A | * | 4/1997 | Schoenzeit et al. | 345/418 |
| 5,991,465 A | * | 11/1999 | Anderson et al. | 382/302 |
| 6,469,801 B1 | * | 10/2002 | Telle | 358/1.2 |
| 6,529,289 B1 | * | 3/2003 | Konno et al. | 358/1.17 |
| 6,556,242 B1 | * | 4/2003 | Dunton et al. | 348/220.1 |
| 6,650,794 B1 | * | 11/2003 | Aoki | 382/306 |

* cited by examiner

*Primary Examiner*—Daniel Miriam
(74) *Attorney, Agent, or Firm*—Farjami & Farjami LLP

(57) ABSTRACT

The present invention envisions the use of a raw image buffer in an imager to aid the imager with power consumption problems and/or timing problems. When captured by the imager, data representing the image captured is directed either to processing circuitry or to a raw image buffer. The processing circuitry transforms the raw image data into a final image. The raw image data may be redirected into a raw image buffer for further processing at a later time. The raw image buffer may be used to buffer up a number of raw images, so that the processing circuitry may operate on the raw images in a single cohesive block of time rather than in intermittent bursts. Or, the raw image buffer may be used to aid in the speed of capturing images. If images are captured faster than the processing circuitry can process the raw data into a final version, the raw image data may be transferred into the raw image buffer for storage, thus allowing the processing circuitry to operate on the stored images in the raw image buffer. This can happen at a later time, thus enabling the imager to collect images at a faster rate than the processing circuitry can process the raw image data into a final version.

18 Claims, 9 Drawing Sheets

IMAGING SYSTEM HAVING AN IMAGE MEMORY BETWEEN THE FUNCTIONAL PROCESSING SYSTEMS

BACKGROUND

1. Technical Field

The present invention is directed to an imaging system contained in an electronic imager. More precisely, the invention is directed to an imaging system having one or more image memory buffers interspersed between the functional portions of the imager.

2. Related Art

Most conventional imaging systems operate in an essentially linear fashion with respect to the functional blocks of the system. That is, acquired data is processed completely through the each and every functional processing step from acquisition to final storage or transmission before another image can be acquired.

In a conventional imaging system, light passes through a lensing system and onto the image sensing circuitry. Next, the output of the image sensing circuitry is sampled and collated by interface circuitry. A process of simple compression by the interface circuitry can be performed at this stage. Then, the image information is sent to additional image processing circuitry in which other high level functions are performed on the image in accordance with the ultimate intended use of the imaging system. This linear flow does not, however, allow for dynamic changes in the imaging system state, not does it allow the system to adapt to faster or slower acquisition schedules.

A user may change the state of the imaging system and thereby affect the operational characteristics of the imaging system, causing additional power to be expended every time an image is sent through the process. For example, a user may acquire images on an intermittent basis, thus necessitating both a power up and a power down of the various functional stages of the imager.

The imaging system may be required to turn on or "power up" upon the processing of each image. This wastes power usage and time.

Additionally, there is no mechanism to implement a method of "gather-and-wait" at the intersection of each of the functional processing unit, before the data is to be acted on by such a functional processing unit. As such, conventional imaging systems waste unnecessary time and power in the pipeline processing of images.

This is inefficient and cumbersome. Each successive image requires the processing of the entire image to a final state before the next image can be acquired. Additionally, power is wasted on each individual passage of image data collected by the digital circuitry as each digital image passes through all of the various stages of the digital imaging system in order, at the time of acquisition. Many other problems and disadvantages of the prior art will become apparent to one skilled in the art after comparing such prior art with the present invention as described herein.

SUMMARY

Various aspects of the present invention can be found in an imaging system comprising an image sensing circuit, an image processing circuit, a transformation circuit, a communication circuit, a final storage device and an intermediate storage queue. The image sensing circuitry produces raw image data, the image processing circuitry processes the raw image data into processed data, the transformation circuitry transforms the processed image data into a final image, the communication circuitry links the imaging system to a final storage device and the intermediate storage queue stores the image data while also awaiting additional processing from the imaging system.

The intermediate storage queue is communicatively coupled to the image sensing circuitry and stores the raw image data, which is delivered to the image processing circuitry upon the occurrence of a specified event. The raw image data can be held in the intermediate storage queue while the image processing circuitry is processing additional image data, until this additional image data has been processed. The raw image data can be stored in the intermediate storage queue until the amount of raw image data in the intermediate storage queue reaches a predetermined threshold level. The processed image data may also be held in the intermediate storage queue while the transformation circuitry is processing additional data. The transformation circuitry may compress the image data.

The imaging system may also include processing circuitry for monitoring the status of the intermediate storage queue and may process the image data in the intermediate storage queue in response to an indication that the imaging system has been linked to an external power source.

In other embodiments of the invention, the electronic imager performs processing on an acquired image and comprises first and second functional imaging subsystems, where each imaging subsystem performs a processing step on the acquired image, and an intermediate image storage buffer, which stores image data communicated from the first functional imaging subsystem to the second functional imaging subsystem.

The electronic imager can also be notified when the image interface circuitry is producing raw image data at a faster rate than the image processing circuitry can process the raw image or when the image processing circuitry is producing a processed image at a faster rate than the transformation circuitry can process the processed image.

Further aspects of the present invention can be found in a method of operating an imaging system, where the method comprising acquiring an initial image in the image sensor, producing a first image data from the initial image in the interface circuitry, processing the first image data into a second image data; and selectively storing the first image data in a buffer based on whether the processing step is already operating on previously communicated first image data. The initial processing step may include transforming a processed image data into final image data via transformation circuitry, and selectively storing the processed image data. This processing step may also include transforming raw image data into processed image data via image processing circuitry, and selectively storing the raw image data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
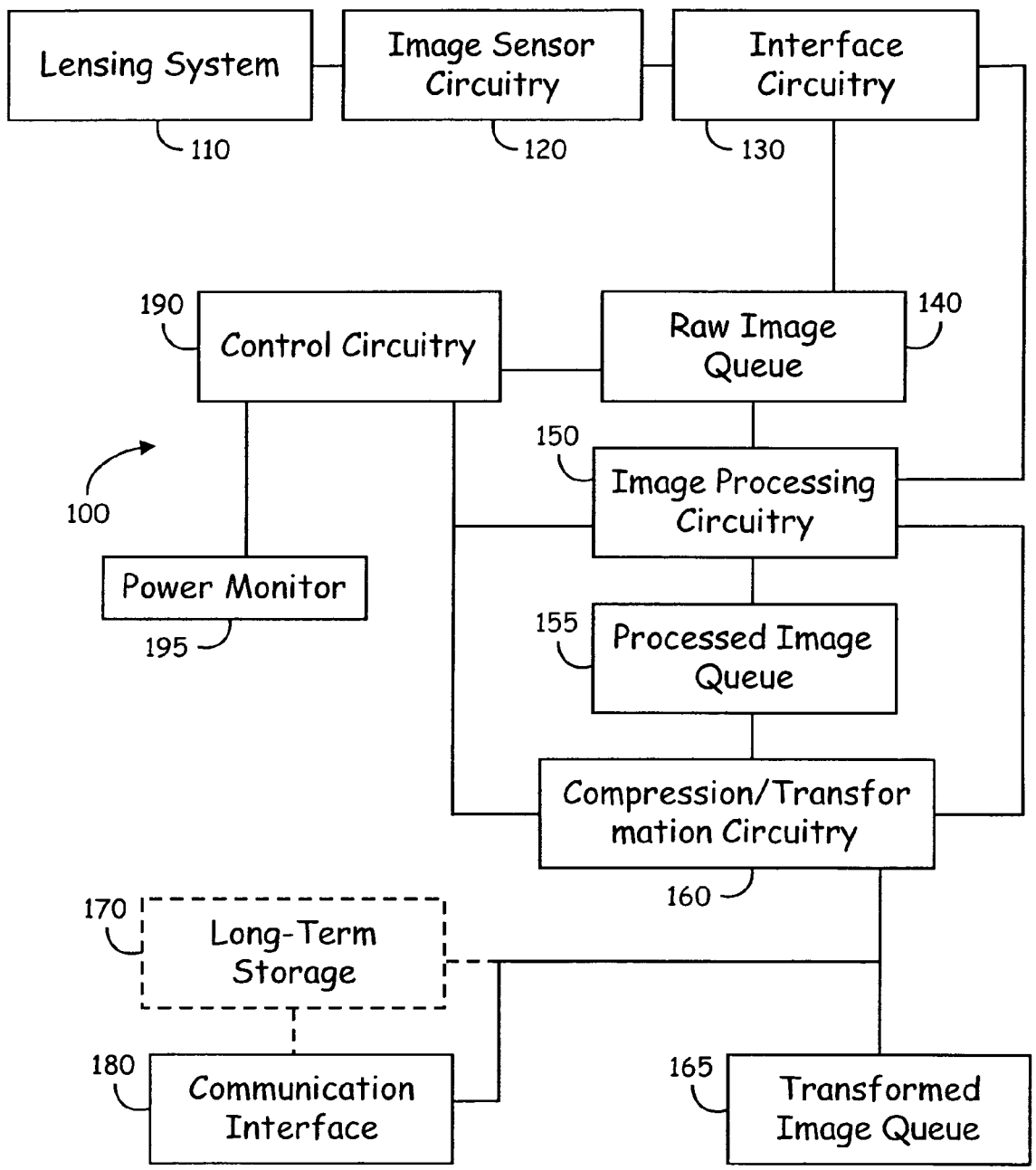
FIG. 1 is a schematic block diagram of one embodiment of an imaging system built in accordance with the invention.

FIG. 1 is a schematic block diagram of an imaging system according to the invention. An imaging system 100 has a lensing system 110 through which light passes into the imaging system. The lensing system is an alterable fixture of the imaging system 100, meaning that the lensing system can be dynamically modified to a number of settings. Or, the lensing system 110 may be a pre-set physical lensing system on the imaging system 100.

Light from the external environment enters the digital imaging system 100 through the lensing system 110 and falls upon an image sensor circuitry 120. The image sensor circuitry 120 detects the light falling onto it through the lensing system 110.

The image sensor circuitry 120 produces a signal representative of the light impinging on it, and this signal is then collected by an interface circuitry 130. Typically, the image sensor circuitry is made up of an array of individual light sensing elements. Each element produces a signal indicative of the intensity of light falling upon, thus producing a full composite array of light intensity signals.

The interface circuitry 130 controls the basic initial gathering of the initial image sensor circuitry signal. The functions performed by the interface circuitry 130 include scanning the rows and columns of the image sensor circuitry 120, analog to digital conversion of the signal from the image sensor circuitry 120, and any other simple pre-processing circuitry common performed on digital images before actual storage in the digital imager.

The interface circuitry 130 may also perform an initial compression of the collected image signal. This aids the imaging system in the passage of data. Typically, the interface circuitry 130 performs a compression of the data up to the order of a five or six fold compression of the collected data. This aids in power conservation of the imaging system 100, as the imaging system now needs only to transfer a portion of the data representative of the signals collected from the individual sensors of the image sensor circuitry 120.

The image data as collected by the image sensor circuitry 120 is may be adaptably and dynamically routed to a raw image queue 140. The compressed or uncompressed raw image data can be stored in the raw image queue 140.

The raw image data is stored in the raw image queue 140 until such time as the queue is directed to be emptied, as dictated by various means. The raw image queue 140 may be emptied due to it filling up, to an outside indication to process the images, or due to an indication that the other functional processing blocks are ready for transmission of the raw image data.

Or, the imager may be operated in an typical operational mode. In this case, the image data falling on the image sensor circuitry 120 may be passed directly to image processing circuitry 150 as it is acquired.

With this intermediate image storage, raw images collected by the imaging system 100 may be quickly and easily stored within the imaging system 100 prior to any processing of the images. Multiple raw images may be stored in the raw image queue prior to processing. These raw images may be stored while the other functional processing systems of the imaging system 100 are busy, or they may be stored in order to conserve power and operate in a "collect and wait" batch mode relative to subsequent functional systems within the imaging system 100. The imaging system 100 can also bypass using the raw image buffer, thereby operating the imaging system in a conventional mode.

The image data falling upon the imaging system 100 is processed by the image processing circuitry 150. The data may be made available from the raw image queue 140, or directly from the interface circuitry 130 after the image has been collected by the image sensor circuitry 120 through the lensing system 110. The image processing circuitry 150 performs basic functions and operations on the raw image data. Thus, the raw data or the simple preliminarily compressed raw data is transformed by the imaging processing circuitry 150 into a data format native to the imaging system 100. The data operated on by the image processing circuitry 150 may be the row/column data of the light impinging on and collected by the image sensor circuitry 120, or may be a preliminarily compressed version of that data.

Additionally, the image processing circuitry 150 may also perform other user-specified functions on the image data. These functions may include various forms of bias control, contrast control, filtering, or other image enhancement functions. Functions may be defined by either the designer or the user of the imaging system 100.

The imaging processing circuitry 150 then communicates the collected and processed image data to the compression or transformation circuitry 160. The compression/transformation circuitry 160 performs a full compression of the data into any one of a number of standard image formats.

Additionally, the compression/transformation circuitry 160 may interact with the image processing circuitry 150 through a processed image queue 155. In a manner similar to the usage of the raw image queue 140, processed images operated on by the image processing circuitry 150 may be stored in the processed image queue for processing by the transformation/compression circuitry 160.

The processed image queue 155 may act as a reservoir for processed image data in a number of modes. The processed image queue 155 may hold a number of processed images until a certain threshold has been stored, thus allowing an efficient and continuous operation of the transformation/compression circuitry 160.

Or, the processed image queue 155 may act as a reservoir for overflow data destined for an already busy transformation/compression circuitry 160. In this case, the transformation/compression circuitry 160 would indicate to the processed image queue to make available a stored image when it is finished processing on another image.

As such, the processed image queue 155 and the raw image queue 140 act as intermediate data buffers. This allows certain processing blocks of the imager to operate in an efficient and continuous manner. These intermediate data buffers also allow for the caching of intermediate image data to ensure continuous and efficient use of the functional processing blocks of the imager 100.

The compression circuitry 160 is communicatively coupled to a communication interface 180. The communication interface 180 allows the final image data to be transmitted to an external environment. For example, the communication interface 180 may involve a communication with a stand-alone computer or other type of electronic device. For example, with the imaging system 100 contained within a camera, the communication interface 180 may be the interface between the digital camera and a computer, where the data is made available to an outside source.

Additionally, the compression circuitry 160 may be communicatively coupled to a long-term storage device 170. The final image data is stored on the long-term storage medium until needed and is requested by the communication interface 180. Such long-term storage may include magnetic disks, writable optical disks, memory sticks, or other storage media such as found in any digital imaging appliances.

A control circuitry 190 may be present in the imaging system 100. The control circuitry 190 would operably interface with the image processing circuitry 150, the raw image queue 140, the compression/transformation circuitry 160, the processed image queue 155, and the interface circuitry 130. The control circuitry 190 would coordinate and operably interface the functionality of the components of the imaging system 100.

Figure 2:
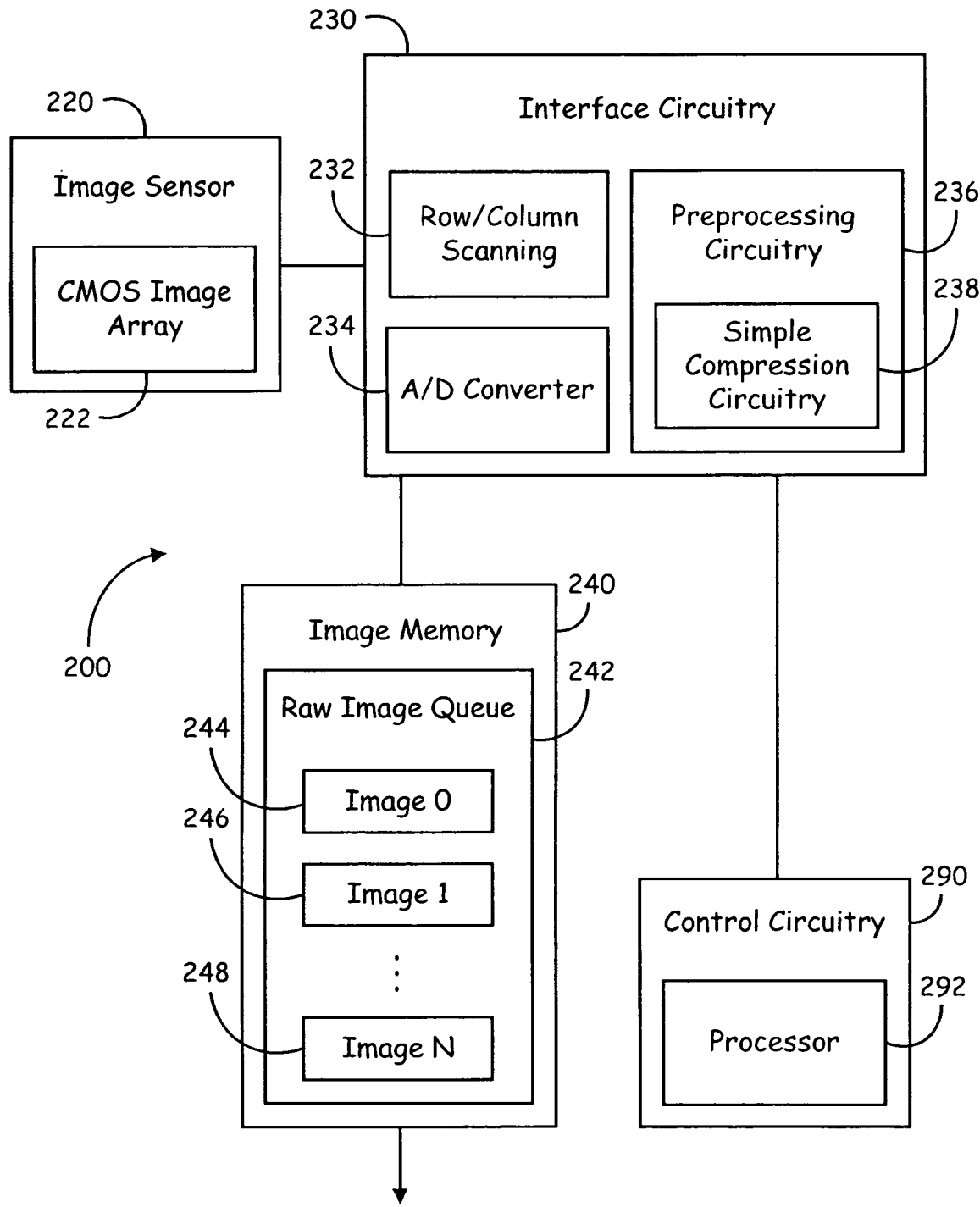
FIG. 2 is a detailed schematic block diagram of the interactions between the image sensor circuitry, interface circuitry, image memory, and control circuitry of FIG. 1.

FIG. 2 is a detailed schematic block diagram of the interactions between the image sensor circuitry, interface circuitry, image memory, and control circuitry of FIG. 1. An imager 200 contains an image sensor 220. The image sensor 220 may be of a variety of imaging devices. For example, the image sensor 220 may contain a Complementary Metal Oxide Semiconductor ("CMOS") image array 222. Alternatively, the image sensor may contain charge-coupled device ("CCD") imaging circuitry, or any other form of electronic imaging components.

When light falls upon the image sensor 220, an electrical signal representative of the strength of the light falling upon each of the elements of the image sensor 220 records a particular intensity of the incident light. An interface circuitry 230 directs the preliminary collection and conversion of the electrical signals present on the elements of the image sensor 220 into a format utilized by the imager 200.

For example, the interface circuitry 230 may contain row and column scanning circuitry 232. The row and column scanning circuitry 232 performs a methodical collection of the signals generated by each of the elements contained in the image sensor 220. Or, the interface circuitry 230 may contain an analog to digital ("A/D") converter 234. The A/D converter 234 serves to convert the signals from the image sensor 220 into a digital format utilizable by the imager 200.

Or, the interface circuitry 230 may contain other pre-processing circuitry 236. For example, the pre-processing circuitry 236 may contain simple compression circuitry 238, which performs a preliminary compression of the data obtained by the image sensor 220.

The interface circuitry 230 is communicatively coupled to an image memory 240. The data collected and acted upon by the interface circuitry 230 can be transferred to the image memory 240. The image memory 240 receives the data as collected and/or modified by the interface circuitry 230 and places this data into a raw image queue 242.

For example, at a time $t_0$ the image sensor 200 obtains an image through the image sensor 220 and operates on that image through the interface circuitry 230. The data corresponding to that obtained image at time $t_0$ is transferred to the image memory 240, and is then placed in the raw image queue 242 in a corresponding slot "Image 1" 244 for a first image. Correspondingly, when the next image is obtained by the digital imager 200 through the image sensor 220 and the interface circuitry 230, this image will again be transferred to the image memory 240. The image memory 240 then places the data corresponding to the next obtained image into the raw image queue 242 at a slot "Image 2" 246.

The successive images obtained by the imager 200 through the image sensor 220 and the interface circuitry 230 are placed in successive slots in the image memory 240. The image memory 240 may have a predetermined number of slots for such images. Or, the image memory may contain a dynamic number of slots, dependent upon numbers and sizes of the images collected.

A control circuitry 290 is communicatively coupled to the image memory 240 and can contain a processor 292. The control circuitry 292 operates the transfer of the data corresponding to the image obtained by the image sensor 220 to the image memory 240 and to the appropriate slot in the raw image queue 242. Upon pre-determined events, the control circuitry 290 may direct that some or all of the data contained in the image slot "Image 1" 244, image slot "Image 2" 246, up to an image slot "Image N" 248 be transferred to processing circuitry of the imager 200 for further processing.

It should be noted that the control circuitry 290 may also disable the transfer of image data obtained by imager 200 from being delivered into the image memory 240. In this event, the image data would be transferred directly to image processing circuitry contained within the imager 200.

Correspondingly, the control circuitry 290 would direct the transfer of image data into and out of the processed image data in a substantially similar manner. However, the destination of the processed image data would be the transformation/compression circuitry 160.

Figure 3:
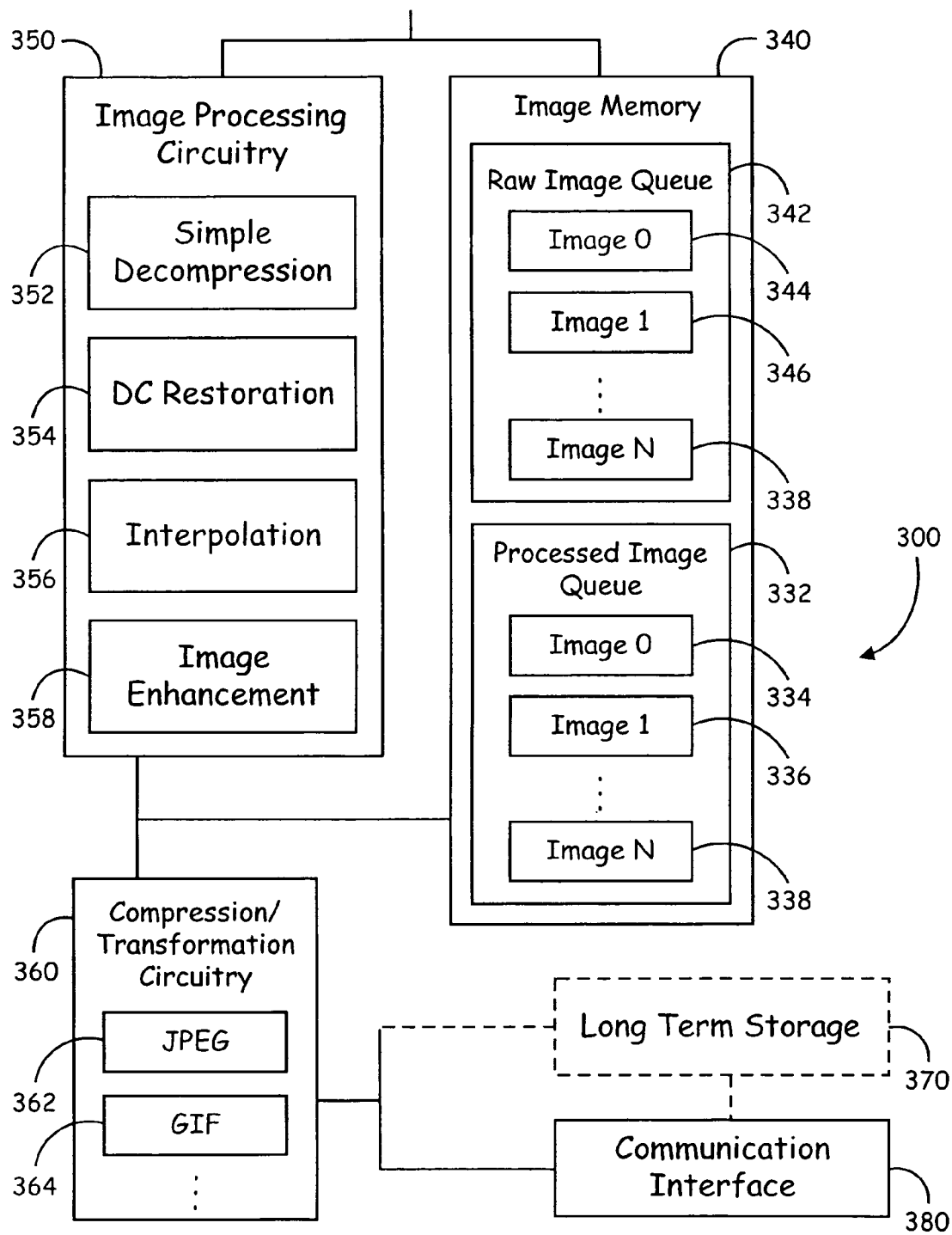
FIG. 3 is a schematic block diagram detailing the interactions of image processing circuitry, an image memory, compression circuitry, long-term storage capability and a communication interface of the imager of FIG. 1.

FIG. 3 is a schematic block diagram detailing the interactions of image processing circuitry, an image memory, compression circuitry, long-term storage capability and a communication interface of FIG. 1. An imager 300 contains an image memory 340 substantially similar to the image memory 240, shown in FIG. 2. The data as collected by the imager 300 through the associated image sensor and interface circuitry is presented to the image memory 340 or image processing circuitry 350 on data lines represented by a line 375. It should be noted that control circuitry (not shown) determines whether the data corresponding to the image collected by the imager 300 is directed into the image memory 340 or the image processing circuitry 350.

If the control circuitry directs that the images are directed into the image memory 340, the image data is stored in a raw image queue 342, substantially similar to the raw image queue 242, shown in FIG. 2. Additionally, the data corresponding to images collected by the imager 300 are placed into image slots "Image 1" 344, "Image 2" 346 through image slot "Image N" 348, as described in relation to FIG. 2.

If the image is directed by the control circuitry into the image processing circuitry 350, the image processing circuitry 350 may perform several different functions on the collected data to transform the data collected by an associative image sensor and interface circuitry into a data file representing an image. The image processing circuitry 350 may contain circuitry to perform DC biasing, or restoration, on the data, as represented by DC restoration circuitry 354. Or, interpolation circuitry 356 may be implemented to further process such data. Additionally, other image enhancement features may be implemented via image enhancement circuitry 358. The image enhancement circuitry may contain contrast control circuitry, filtering circuitry, or other transformative features. It should be noted that this circuitry may be implemented by a processor operating on the data in addition to having actual circuitry perform the operations on an integrated circuit chip. Furthermore, the image processing circuitry 350 may include and thereby implement a defect correction feature through defect correction circuitry 357.

Additionally, the image processing circuitry 350 contains decompression circuitry 352. The decompression circuitry 352 decompresses the data from the compression step as depicted in the simple compression circuitry 238, shown in FIG. 2. It should be noted that in addition to performing these operations on data from an attached image sensor and interface circuitry, that the image processing circuitry 350 may also perform the same functions on raw data as stored in the image memory 340.

Thus, the imager 300 may operate at dual speeds in the collection and/or processing of the image data. For example, the imager 300 may be operated at a faster collection speed than the image processing circuitry 350 may be able to adequately handle.

The raw data corresponding to images collected by an image sensor and interface circuitry would be stored in the image memory 340. In particular, the raw images would be stored in appropriate slots in the raw image queue 342. The image processing circuitry 350 would operate on such slots in the time allotted for such processing. If the image processing circuitry 350 cannot perform all processing activities on a single image before the data from the next image is presented, then the data corresponding to the next image may be stored in the raw image queue 342 for later operations by the image processing circuitry 350 when time allows. Thus, during faster operations, bottlenecks in the imager 300 may be avoided by use of the raw image memory queue 340.

After the raw image data has been processed by the image processing circuitry 350, the processed data may be operated on by compression circuitry 360. In this manner, the compression circuitry 360 serves to transform the internal format of the image data into other more widely known formats. For example, JPEG circuitry 362 may transform the internal data representation of the image collected by the imager 300 into a JPEG image format file. Correspondingly, GIF circuitry 364 may transform the raw images as processed by the image processing circuitry 350 into a GIF format data stream.

A processed image queue 332 allows the storage of processed data form the image processing circuitry 350 and before its transfer to the transformation/compression circuitry 360. The processed image queue 332 allows a buffering operation to be performed on the data flowing between the image processing circuitry 350 and the transformation/compression circuitry 360 in a manner substantially similar to how the raw image queue 342 allows for data buffering between the interface circuitry and the image processing circuitry of a imaging system.

After the compression circuitry 360 has transformed the data representing the image obtained by the imager 300 through an associated image sensor and interface circuitry, the data is directed to a communications interface 380. The communications interface 380 allows the imager 300 to communicate with an external environment. In this manner images collected by the imager 300 may be transferred to another electronic storage device such as a personal computer.

Additionally, the imager 300 may contain a long-term storage device 370. The long-term storage device 370 is communicatively coupled to the compression circuitry 360 and to the communication interface 380. Thus, the data that the imager 300 collects through the image sensor and associated interface circuitry, and that is then processed by image processing circuitry and compression circuitry, may be stored internally for a period of time. From the long term storage device 370 the image data collected by the imager 300 may be transferred to the communication interface 380 for transmission to an external environment.

Figure 4:
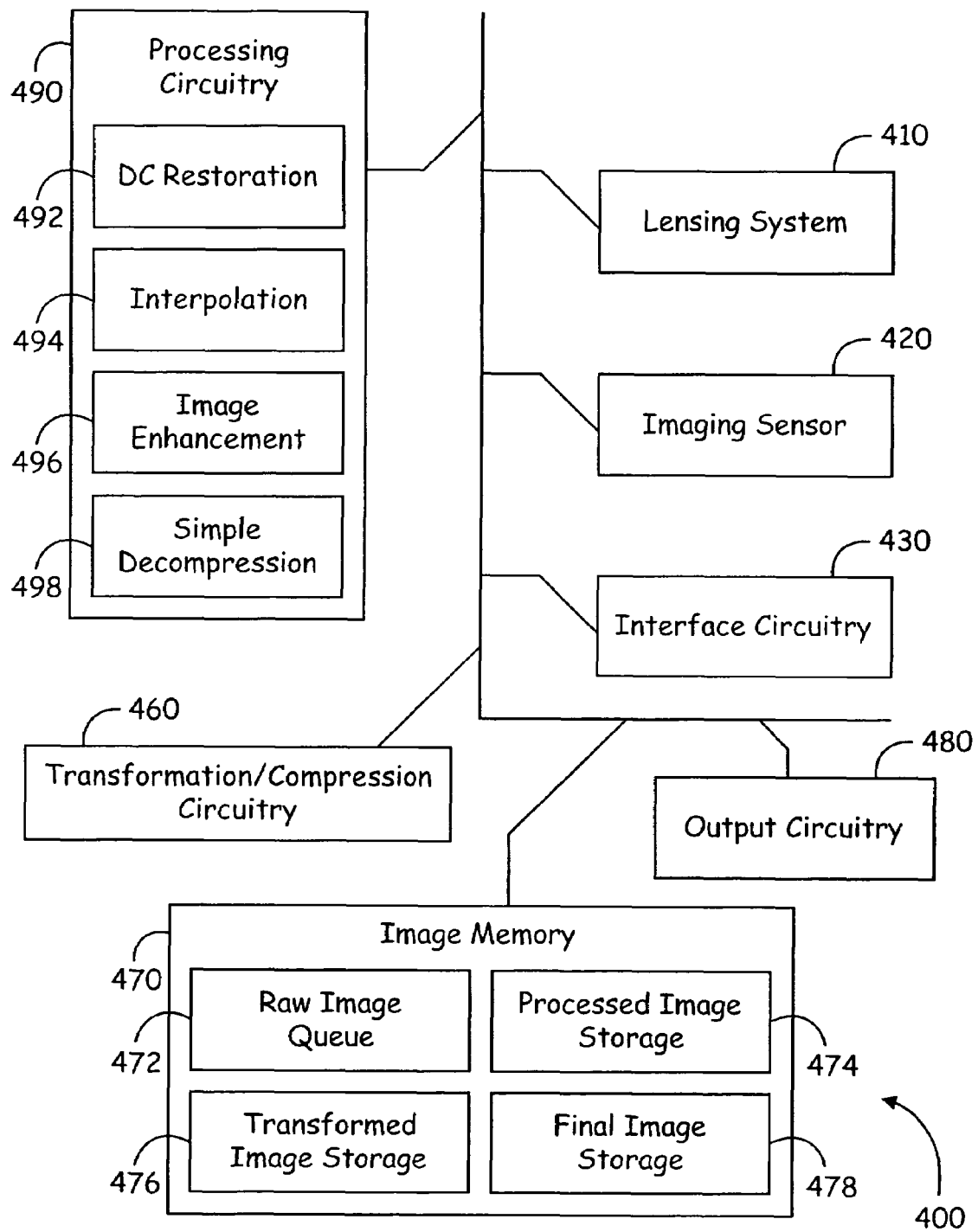
FIG. 4 is a schematic diagram of an exemplary imager of FIG. 1.

FIG. 4 is a schematic diagram of an exemplary imager of FIG. 1. An imager 400 contains a lensing system 410, an imaging sensor 420, interface circuitry 430, processing circuitry 490, an image memory 470, and output circuitry 480. The imager components are communicatively coupled internally through a connection 475.

In the imager 400, the raw images as collected by the lensing system 410, the imaging sensor 420, and the interface circuitry 430 and the data of the processed images are both stored in a common image memory 470.

The image memory 470 contains a raw image queue 472 where image data collected by the imager 400 through the lensing system 410, the imaging sensor 420, and the interface circuitry 430 are stored as described above. Additionally, the data as collected through the lensing system 410, the imaging sensor 420, and the interface circuitry 430 may be directed into the processing circuitry 490 for conversion into data corresponding to a processed image. The data corresponding to this processed image is stored in the image memory 470 or in a processed image buffer 474.

In the event of a rapid collection of raw image data from the lensing system 410, the imaging sensor 420, and the interface circuitry 430, overflow raw image data collected but not yet processed is stored in the raw image queue 472. Upon request, these raw images as stored in the raw image queue 472 are transferred to the processing circuitry 490 for conversion into processed images. Data corresponding to these final processed images may then be stored in the processed image queue 474. Thus, both processed and raw images may be stored in a common image memory 470. It should be noted that each may be stored in a separate memory apart from one another for the sake of internal speed.

The processed image queue 474 allows similar functionality on data processed by the processing circuitry 490 and awaiting other functional processing by the transformation/compression circuitry 440. The processed image queue 440 allows for a rapid processing of data apart from the final compressive and/or transformative step.

Figure 5:
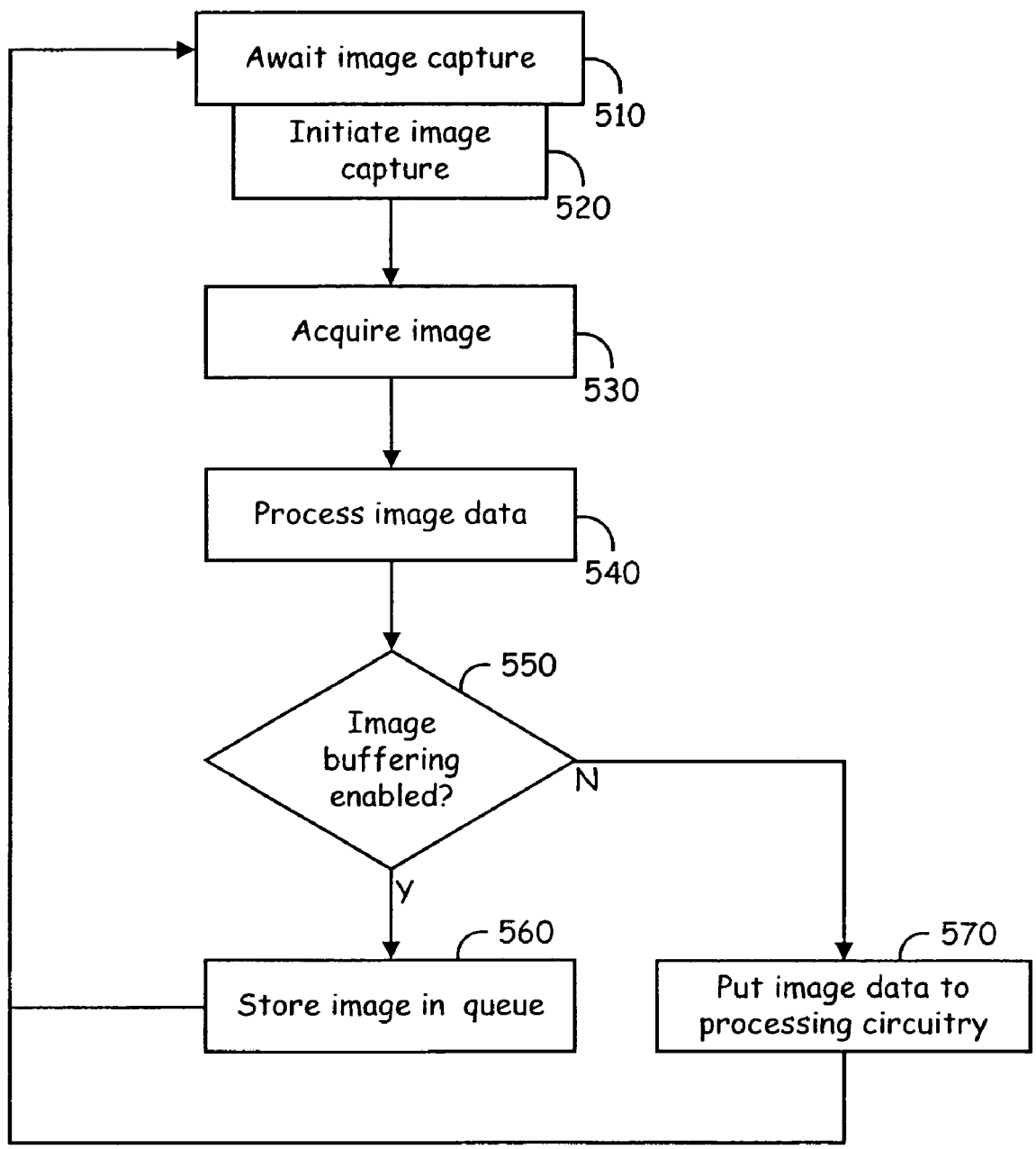
FIG. 5 is a data flow diagram depicting the steps in which the imager of FIG. 1 may be operated.

FIG. 5 is a data flow diagram describing the steps in which the imager of FIG. 1 may be operated. Upon the beginning of a cycle an imager awaits for a command to capture an image in a block 510. Upon the initiation of capturing an image in a block 520, the imager acquires the image in electronic form in a block 530. Control transfers to a block 550, wherein the imager decides whether to buffer the acquired image. If buffering of the images is not needed, or if it is not enabled, the image data is transferred to processing circuitry in a block 570. The imager then returns to the state represented in the block 510 awaiting the next image capture command. If image buffering is necessary in the block 550, the image buffer stores the image in a raw image queue in a block 560. In this case, the data representing the raw image captured by the imager is not processed by the processing circuitry. Rather, the raw image as stored as an image in the raw image queue, will be operated on by the processing circuitry at a later point in time.

Alternatively, after the raw image is acquired in the block 530, the data representing the image is pre-processed in a block 540. The pre-processed data is then sent either to the processing circuitry in the block 570 or stored in the raw image queue in the block 560

Figure 6:
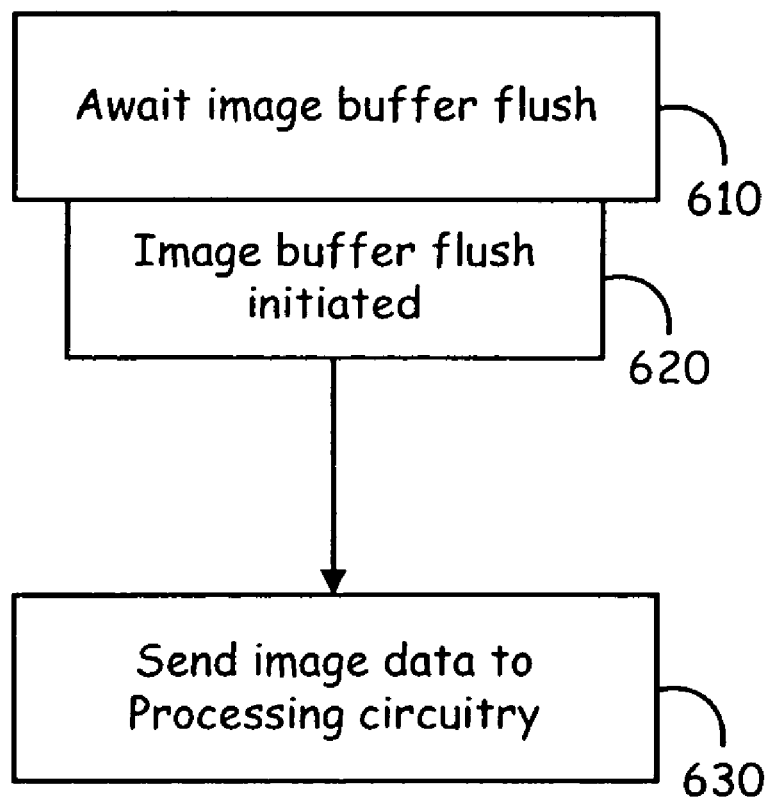
FIG. 6 is a block diagram depicting the processing and outflow of a raw image buffer of FIG. 1.

FIG. 6 is a block diagram depicting the processing and outflow of the raw image buffer of FIG. 1. In a block 610, the imager awaits a signal to initiate a flush of a buffer of some type. In a block 620, a signal is received where the imager has requested that all or a portion of the contents of the raw image buffer will be transferred to the processing circuitry for further processing. Upon the receipt of such signal, the imager then sends appropriate raw image data to the processing circuitry in a block 630

It should be noted that the operation and outflow of a processed image buffer as shown in FIG. 1 would operate in a substantially similar way. This would allow for the operation of FIG. 6 with the processing circuitry and the transformation/compression circuitry as depicted in FIG. 1.

Figure 7:
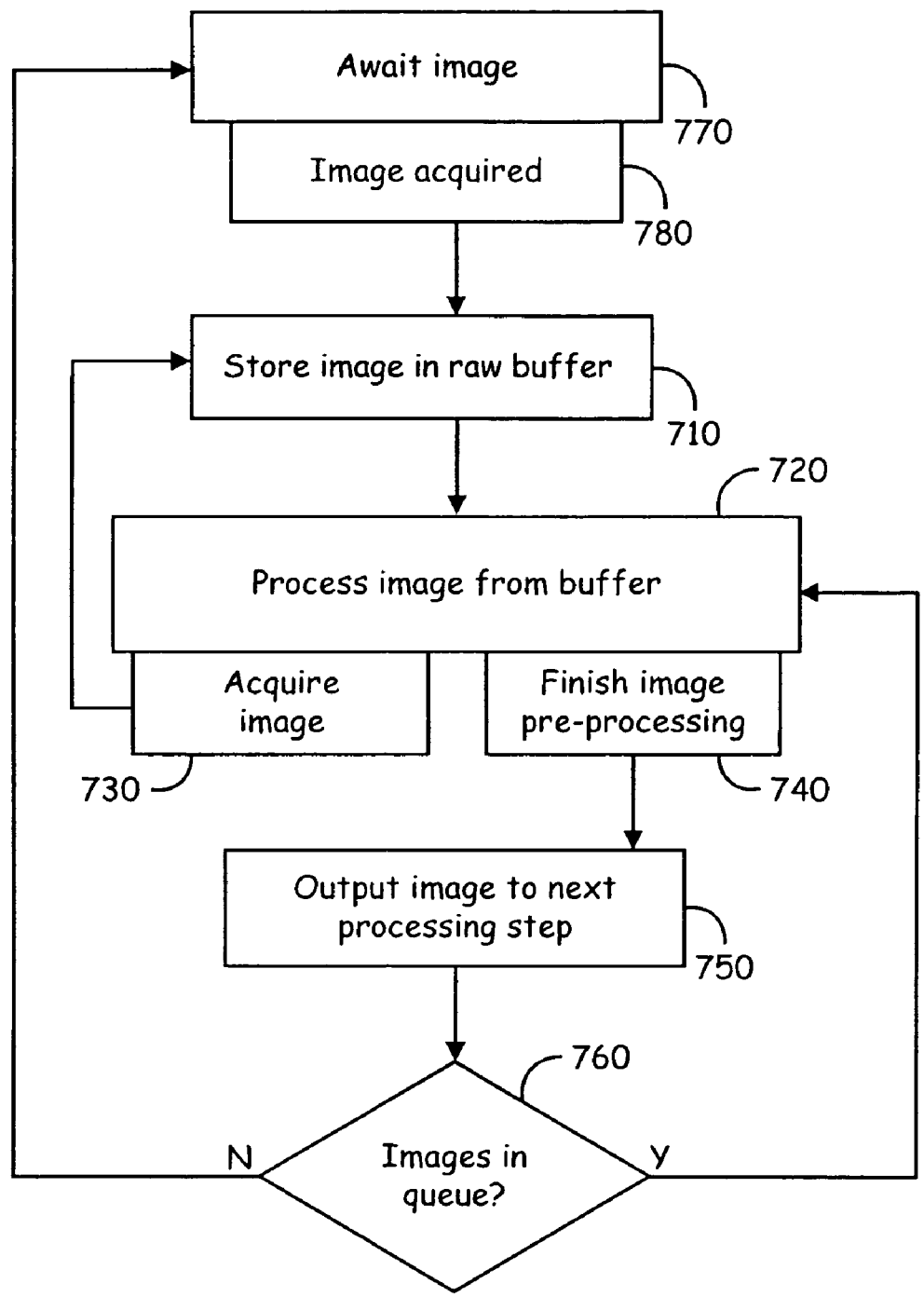
FIG. 7 is a block flow diagram of the operation of the raw image buffer, the pre-processing circuitry, and the control circuitry of FIG. 1.

FIG. 7 is a block flow diagram of the operation of the raw image buffer, the processing circuitry, and the control circuitry of FIG. 1. First, an imager awaits the capture of an image in a block 770. In a block 780 the imager has acquired an image, and in a block 710, the imager stores the raw image to a raw image data buffer.

In a block 720, the imager then directs processing of the data from in the raw image buffer. In a block 730, and before the processing is finished on the first image in the raw image buffer, another image is acquired by the imager. Control transfers to the block 710 in which the second image is stored to the raw buffer that already contains the first image. In a block 720 the control circuitry directs the processing of the image stored in the raw image buffer. Additional images may be acquired during this period of time, at which point the additional images are added to the raw image buffer through the path shown in blocks 730 and 710.

In a block 740, the imager has completed processing of one of the images from the raw image buffer. At that point, the processed image may be output either to the transformation/compression circuitry, or to another intermediate storage queue to await processing by the transformation/compression circuitry.

At the point depicted in block 750, the imager determines if there are additional images awaiting processing in the queue in a block 760. If no further images are contained in the raw image buffer 760, control reverts back to the block 770 where the imager awaits the acquisition of another image.

If there are additional images in the raw image buffer, control reverts back to the block 720, in which the processing circuitry interacts with the raw image buffer and processes the contents of the raw image buffer in the block 720 as described above.

It should be noted that the interaction of the processing circuitry, the transformation/compression circuitry, and the processed image queue may operate in a substantially similar fashion.

Figure 8:
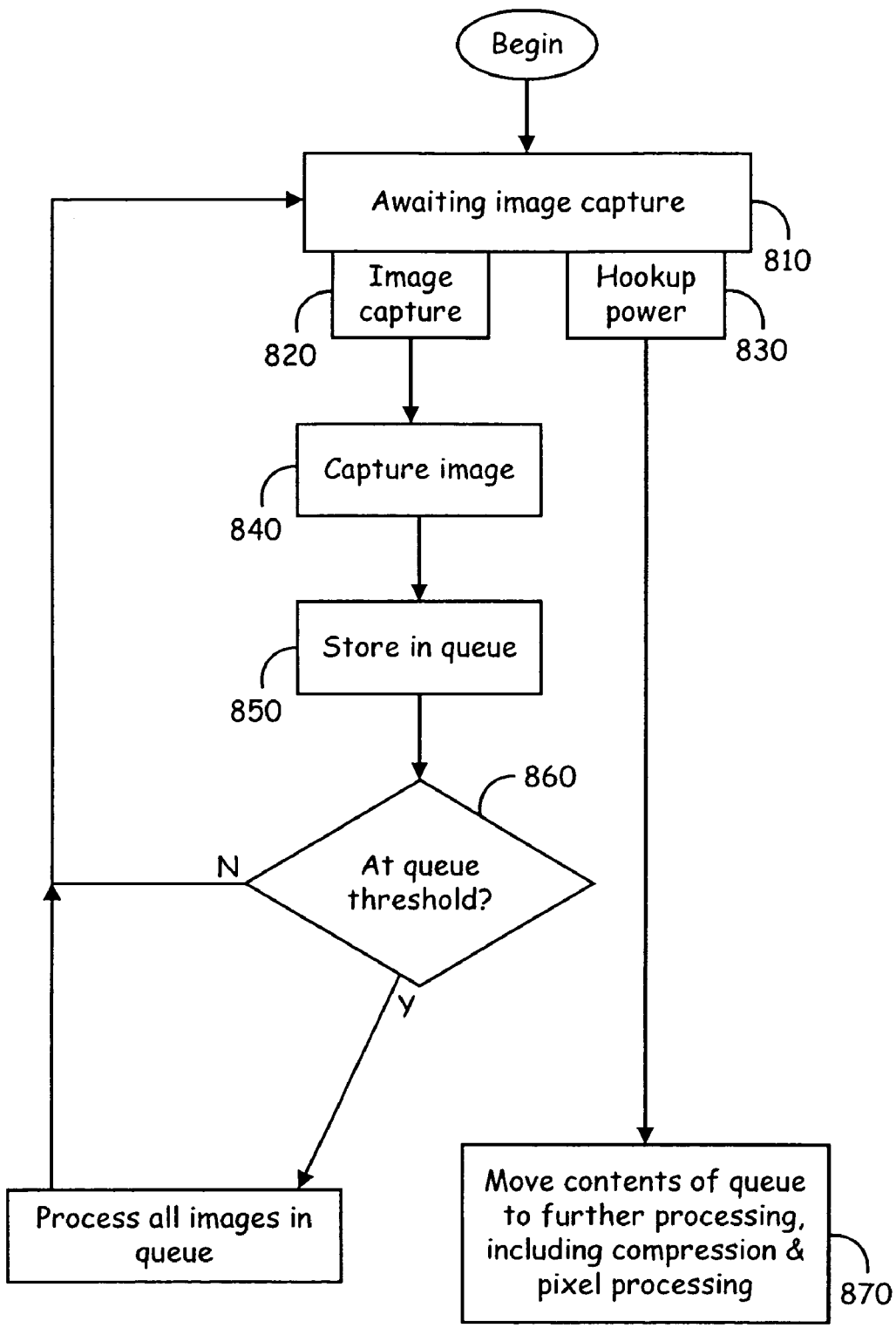
FIG. 8 is a flow diagram of an embodiment of the invention in which the image buffer of FIG. 1 could be used in an imaging application.

FIG. 8 is a flow diagram of an embodiment of the imager of FIG. 1. In a block 810, the imager awaits the capture of an image. Upon the capture of an image in a block 820, the imager captures the image through an image sensor, a lensing system, and interface circuitry. The raw data may also be operated on by interface circuitry with preliminary processing, as described above. The raw image data is then stored in a raw image queue in a block 850. Upon storage of the captured image in the block 850, the imager checks the number of images contained in the raw image queue in a block 860.

If the number of images in the raw image queue falls below a set threshold, the imager simply awaits the capture of another image. This process continues until the threshold at which processing takes place is met. Once the number of images contained in the raw image queue is met in the block 860, control transfers to a block 870, and the imager moves the contents of the raw image queue to the processing circuitry for further processing. This processing can, for example, include compression, interpolation, DC biasing, filtering, or image enhancement as dictated by a user or by the design of a specific imager.

It should be noted that in this system, power is conserved since the processing circuitry is used only for specific blocks of time, and is not started and restarted intermittently over irregular image capture intervals. Greater efficiency is achieved in power consumption due to the even processing of the raw images from the raw image buffer. However, when power is not a concern, then the raw images may be flushed and processed. In a block 830, the imager has been connected to an external power source. At that point, the contents of the raw image queue are moved to the processing circuitry for further processing as described above.

Thus, an imaging system containing intermediate image memory or memories is described, where a pre-processed version of the captured image is stored, allowing for increased power efficiency in the processing circuitry of the imager and for the ability to clock the input of images into the imager at a rate not limited by the speed of the processing circuitry of the imager.

Figure 9A:
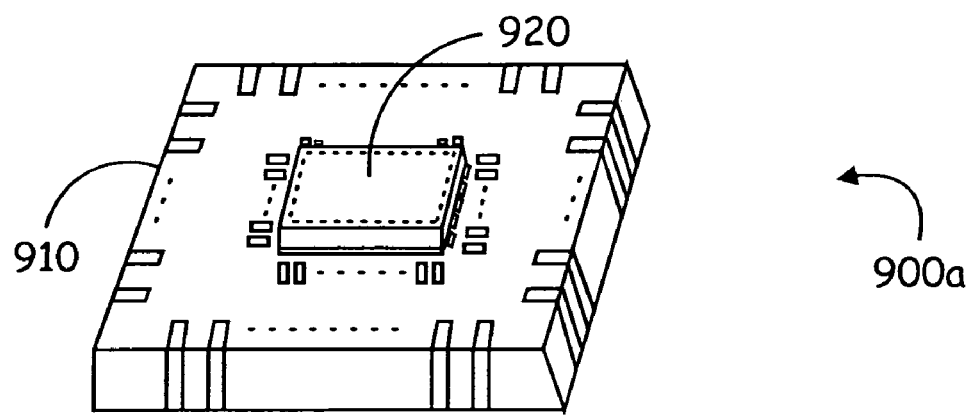
FIG. 9a is a perspective view of an embodiment of the imager of FIG. 1 implemented in a single chip format.

FIG. 9a is a perspective view of an embodiment of the imager of FIG. 1 implemented in a single chip format. An imaging system 900a may be implemented by mounting a single chip 920 on a die 910. The single chip 920 is typically a hybrid chip in that it contains analog and digital functionality.

Figure 9B:
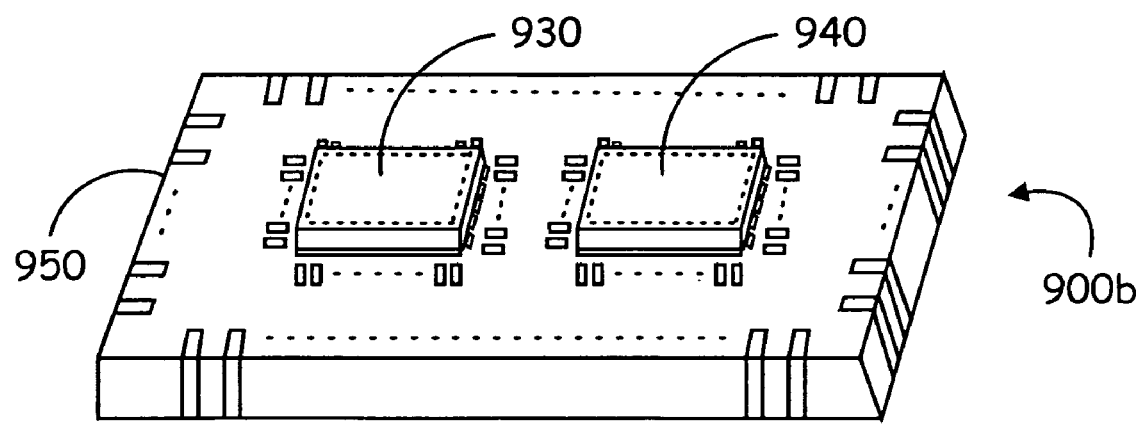
FIG. 9b is a perspective view of an embodiment of the imager of FIG. 1 implemented in a two-chip format.

FIG. 9b is a perspective view of an embodiment of the imager of FIG. 1 implemented in a two-chip format. Conversely, an imaging system 900b may be implemented by mounting a first chip 930 and a second chip 940 on a die 950. Here, one of the chips, for example, the first chip 930 would contain analog functionality, while the second chip 940 would contain digital functionality. Or, the chips may both be hybrid in nature. The implementation of either chip with analog or digital functionality is interchangeable.

The use of the single-chip format depicted in FIG. 9a or the dual chip format depicted in FIG. 9b is dictated by the speed, power and circuit size limitations of a particular application and can be determined by the designer or the end user of the imaging system.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

While various embodiments of the invention have been described, it will be apparent to those of ordinary skill in the art that many more embodiments and implementations are possible that are within the scope of this invention.

I claim:

1. An imaging system comprising:
    an image sensing circuitry that produces a raw image data;
    an image processing circuitry, communicatively coupled to the image sensing circuitry, that processes the raw image data into a processed intermediate image data;
    a transformation circuitry, separate from said image processing circuitry and communicatively coupled to the image processing circuitry through an intermediate storage queue, that transforms the processed intermediate image data into a processed final image data;
    a communication circuitry, communicatively coupled to the transformation circuitry, that links the imaging system to a final storage;
    said intermediate storage queue configured to store one or more processed intermediate image data, wherein the intermediate storage queue is communicatively coupled to the image processing circuitry and the transformation circuitry; and
    the intermediate storage queue storing the one or more processed intermediate image data from the image processing circuitry awaiting additional image processing by the transformation circuitry.

2. The imaging system of claim 1 wherein the intermediate storage queue is communicatively coupled to the image sensing circuitry and stores one or more raw image data, the one or more raw image data being delivered to the image processing circuitry upon the occurrence of an event.

3. The imaging system of claim 2 wherein the one or more raw image data is held in the intermediate storage queue while the image processing circuitry is processing another image data, and one of the one or more raw image data is delivered to the image processing circuitry when the image processing circuitry ceases processing on the another image data.

4. The imaging system of claim 2 wherein additional raw image data are stored in the intermediate storage queue, and each of the raw image data stored in the intermediate storage queue are delivered to the image processing circuitry when the amount of raw image data in the intermediate storage queue reaches a predetermined level.

5. The imaging system of claim 1 wherein the one or more processed intermediate image data is held in the intermediate storage queue while the transformation circuitry is processing another processed intermediate image data, and one of the one or more processed intermediate image data is delivered to the transformation circuitry when the transformation circuitry ceases processing on the another processed intermediate image data.

6. The imaging system of claim 1 wherein additional processed intermediate image data are stored in the intermediate storage queue, and each of the processed intermediate image data stored in the intermediate storage queue are delivered to the transformation circuitry when the amount of processed intermediate image data in the intermediate storage queue reaches a predetermined level.

7. The imaging system of claim 1 wherein the transformation circuitry performs a compression on the image data.

8. The imaging system of claim 1 further comprising a processing circuitry monitoring the status of the intermediate storage queue.

9. The imaging system of claim 1, wherein the imaging system processes the image data in the intermediate storage queue in response to an indication that the imaging system has been linked to an external power source.

10. A method of operating an imaging system, the method comprising:
    producing a raw image data by an image sensing circuitry of the imaging system;
    processing the raw image data into a processed intermediate image data by an image processing circuitry communicatively coupled to the image sensing circuitry;
    transforming the processed intermediate image data into a final image data by a transformation circuitry separate from said image processing circuitry and communicatively coupled to the image processing circuitry through an intermediate storage queue;
    linking the imaging system to a final storage via a communication circuitry communicatively coupled to the transformation circuitry;
    storing one or more processed intermediate image data in said intermediate storage queue;
    wherein the intermediate storage queue is communicatively coupled to the image processing circuitry and the transformation circuitry, and wherein the intermediate storage queue storing the one or more processed intermediate image data from the image processing circuitry awaiting additional image processing by the transformation circuitry.

11. The method of claim 10, wherein the intermediate storage queue is communicatively coupled to the image sensing circuitry, the method further comprising:
    storing one or more raw image data; and
    delivering the one or more raw image data to the image processing circuitry upon the occurrence of an event.

12. The method of claim 11 further comprising:
    holding the one or more raw image data in the intermediate storage queue while the image processing circuitry is processing another image data; and
    delivering one of the one or more raw image data to the image processing circuitry when the image processing circuitry ceases processing on the another image data.

13. The method of claim 11 further comprising:
    storing additional raw image data in the intermediate storage queue; and
    delivering each of the raw image data stored in the intermediate storage queue to the image processing circuitry when the amount of raw image data in the intermediate storage queue reaches a predetermined level.

14. The method of claim 10 further comprising:
    holding the one or more processed intermediate image data in the intermediate storage queue while the transformation circuitry is processing another image data; and
    delivering one of the one or more processed intermediate image data to the transformation circuitry when the transformation circuitry ceases processing on the another image data.

15. The method of claim 10 further comprising:
storing additional processed intermediate image data in the intermediate storage queue; and
delivering each of the processed intermediate image data stored in the intermediate storage queue to the transformation circuitry when the amount of processed image data in the intermediate storage queue reaches a predetermined level.

16. The method of claim 10 further comprises compressing the image data using the transformation circuitry.

17. The method of claim 10 further comprises monitoring the status of the intermediate storage queue using a processing circuitry.

18. The method of claim 10 further comprises processing the image data in the intermediate storage queue in response to an indication that the imaging system has been linked to an external power source.

* * * * *